E. G. HUDSON.
VARIABLE DISPLAY OR DEMONSTRATING DEVICE.
APPLICATION FILED DEC. 2, 1915.

1,253,244.  Patented Jan. 15, 1918.

INVENTOR:
E. G. Hudson
ATTYS

UNITED STATES PATENT OFFICE.

EVERETT G. HUDSON, OF BROCKTON, MASSACHUSETTS.

VARIABLE DISPLAY OR DEMONSTRATING DEVICE.

1,253,244.　　　　Specification of Letters Patent.　Patented Jan. 15, 1918.

Application filed December 2, 1915. Serial No. 64,689.

*To all whom it may concern:*

Be it known that I, EVERETT G. HUDSON, a citizen of the United States, residing at Brockton, in the county of Plymouth and State of Massachusetts, have invented new and useful Improvements in Variable Display or Demonstrating Devices, of which the following is a specification.

This invention has for its object to provide, particularly for the use of salesmen, a device whereby a variable picture of an article of merchandise, such as a shoe, may be readily produced by the salesman and exhibited to a customer, the device including a partially transparent unmodified picture produced by the assemblage of an opaque body sheet which has an aperture shaped with reference to the article, and a transparent sheet covering the aperture and provided with suitable pictorial indicia, and said picture being capable of modification as to color, texture, etc., by backing sheets placed behind the transparent sheet and usable interchangeably, the whole constituting a compact article adapted to be conveniently carried with a large number of similar articles.

Of the accompanying drawings forming a part of this specification,—

The same reference characters indicate the same or similar parts in all of the figures.

Figure 1:
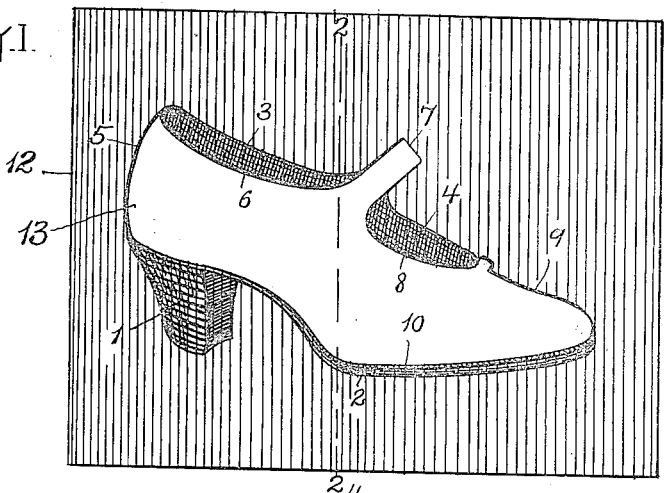
Figure 1 represents a side view of the opaque body sheet.
Figure 2:
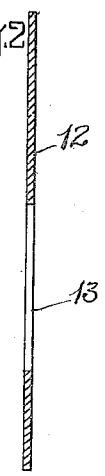
Fig. 2 represents a section on the line 2—2 of Fig. 1.
Figure 3:
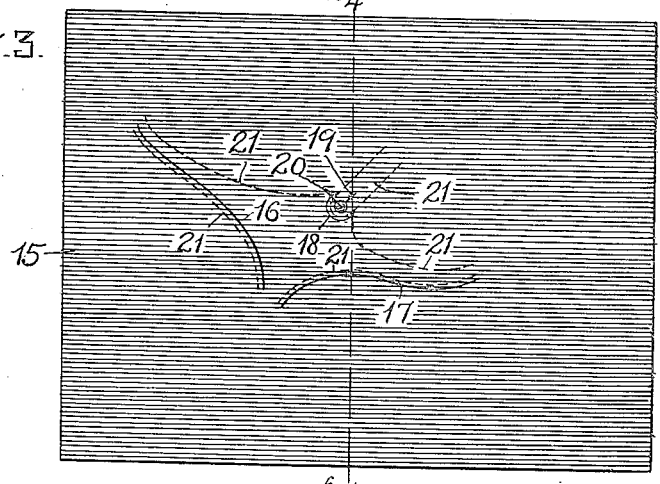
Fig. 3 represents a side view of the transparent sheet.
Figure 4:
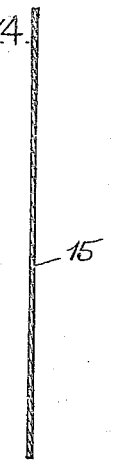
Fig. 4 represents a section on the line 4—4 of Fig. 3.

Referring first to Figs. 1 to 6 inclusive: 12 represents a flat sheet which may be of cardboard or other suitable material, and is provided with an aperture 13 shaped with reference to an article of merchandise, such as a shoe. The front side of the sheet 12 bears pictorial indicia coöperating with the aperture 13 in forming an incomplete picture of the said article. As here shown, said indicia include representations of the heel 1, the sole edge 2, and the portions 3 and 4 of the foot-receiving opening, the shoe represented having a low-cut upper, and the foot-receiving opening being bridged by an instep strap. The said indicia may be applied by printing photographically or otherwise, or by painting, or in any other suitable way. The edges of the aperture 13 are shaped to coöperate with said indicia in forming an incomplete or interrupted picture.

The body sheet 12 thus treated, when viewed alone, presents a picture, the portions 1, 2, 3, and 4 of which are complete, while the portion bounded by the margin of the aperture 13 is vacant or incomplete, certain details being missing. The edge portions 5, 6, 7, 8, 9 and 10 of the aperture constitute details of the picture, other details of which are furnished by the portions 1, 2, 3 and 4. 15 represents a transparent sheet preferably of flexible material such as celluloid, formed to cover the aperture 13, and cemented or otherwise attached to the back of the body sheet 12.

Figure 5:
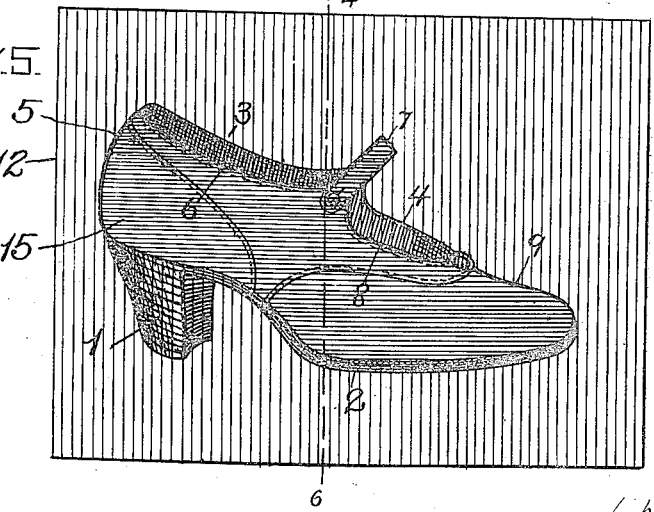
Fig. 5 represents a side view of the complete device.
Figure 6:
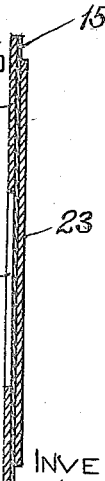
Fig. 6 represents a section on the line 6—6 of Fig. 5.

The portion of the transparent sheet, which is exposed and visible through the aperture 13, bears indicia supplying the missing details of the picture such as the edges 16 and 17 of parts of the upper, the end portion 18 of the instep strap, the strap buttonhole 19, the button 20, and the lines of stitches 21. The assembled sheets 12 and 15 therefore present a picture of the article which shows all the details thereof, as shown by Fig. 5.

The indicia on the sheet 15 constitute a skeleton picture portion made up principally of fine lines surrounded by transparent portions of the sheet so that a nearly unobstructed view is had through the exposed portion of the transparent sheet.

23 represents a backing sheet or swatch of material entering into the construction of the pictured article, said material being used for example for the vamp, quarters, and instep strap of a shoe. The backing sheet is formed to cover the back of the exposed portion of the transparent sheet and is marginally covered and concealed by the body sheet 12. The exposed portion of the backing sheet 23, viewed through the aperture 13 and the exposed portion of the transparent sheet complete the picture of the article and impart thereto certain characteristics of color, texture, etc., which are lacking when the assembled sheets 12 and 15 are viewed without the backing sheet. It will now be seen that a salesman, equipped with the assembled sheets 12 and 15, and with a plurality or series of backing sheets or swatches 23 each differing from the other, is able to quickly present a realistic picture of the article he desires to sell, and to vary the picture by using different backing sheets interchangeably, so that the customer, who may be a shoe jobber or retailer, is enabled, without seeing actual sample shoes, to order shoes with uppers made of any of the materials used for the backing sheets.

The transparent sheet furnishes a simple, compact, convenient and durable means for superimposing on the backing sheet picture details, breaking the monotony of the backing sheet and heightening the impression of realism, without objectionably obstructing the view of the backing sheet.

It will be understood that the sheet 15, as illustrated and described, contains partial illustration which coöperates with other illustration surrounding the aperture in sheet 12, but the invention is not limited in this particular, as it is quite obvious that the ornamentation surrounding the aperture may be entirely omitted from that position and all applied to the sheet 15.

While I have shown and described a shoe as the pictured article, I do not limit myself thereto, it being obvious that the invention may be embodied in devices representing a variety of articles of merchandise commonly sold by the aid of samples, the form of the aperture in the body sheet and the details of the picture being suited to the pictured article.

I claim:

A variable display or demonstrating device comprising a body sheet of opaque material having an aperture shaped to the outline of the form to be illustrated, the area bounded by the edges of said aperture being unobstructed, a transparent sheet provided with an opaque design complemental to the contour of said aperture and positioned to be displayed opposite the aperture, and a plurality of backing sheets, each differing from the other, and each capable of being selectively placed back of the transparent sheet to produce independently characterized pictures of the article depicted by the body and transparent sheets.

In testimony whereof I have affixed my signature.

EVERETT G. HUDSON.